United States Patent
Dasgupta et al.

(10) Patent No.: US 11,328,406 B2
(45) Date of Patent: May 10, 2022

(54) SYSTEM AND METHOD FOR AUTOMATED MICROSTRUCTURE ANALYSIS

(71) Applicant: Siemens Aktiengesellschaft, Munich (DE)

(72) Inventors: Arindam Dasgupta, Avon, CT (US); Biswadip Dey, Plainsboro, NJ (US); Anand A. Kulkarni, Charlotte, NC (US); Amit Chakraborty, East Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 16/810,129

(22) Filed: Mar. 5, 2020

(65) Prior Publication Data

US 2021/0279853 A1   Sep. 9, 2021

(51) Int. Cl.
*G06T 7/00* (2017.01)
*G06T 7/62* (2017.01)
*G06T 5/00* (2006.01)
*G06N 20/00* (2019.01)

(52) U.S. Cl.
CPC ............ *G06T 7/0004* (2013.01); *G06N 20/00* (2019.01); *G06T 5/002* (2013.01); *G06T 7/62* (2017.01); *G06T 2207/10056* (2013.01); *G06T 2207/20182* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 7,840,066 B1 * | 11/2010 | Chen | G06T 5/40 382/168 |
| 2017/0231550 A1 * | 8/2017 | Do | A61B 5/0077 382/128 |
| 2018/0247395 A1 * | 8/2018 | Aoi | G02B 21/368 |
| 2020/0165653 A1 * | 5/2020 | Watanabe | G01N 15/1475 |
| 2020/0271910 A1 * | 8/2020 | Tsuchida | G02B 21/361 |
| 2021/0358121 A1 * | 11/2021 | Bangia | G06F 16/383 |

* cited by examiner

*Primary Examiner* — Leon Viet Q Nguyen

(57) ABSTRACT

A computer-implemented method for assessing material microstructure of a machine component involves obtaining a raw image of a section of the component captured via a microscope. The method further includes pre-processing the raw image to generate a ternary image defined by pixel data including three levels of intensities. The method further includes identifying, from the ternary image, phase boundaries delineating at a phase in a primary constituent material of the component. The method further includes determining a volume associated with the phase based on the identified phase boundaries. The proposed method may be utilized, for example, as an automated tool for assessing material degradation and for quality control of gas turbine engine components.

18 Claims, 8 Drawing Sheets micron (equal scale on both axes)

SYSTEM AND METHOD FOR AUTOMATED MICROSTRUCTURE ANALYSIS

BACKGROUND

1. Field

The present disclosure relates, in general, to the field of material microstructure analysis via imaging. Aspects of the present disclosure may be utilized as an automated tool for assessment of material degradation and/or quality control of machine components, such as gas turbine engine components.

2. Description of the Related Art

Assessment of structural integrity of gas turbine parts, such as turbine blades, is of critical importance towards facilitating safe, reliable and durable operation of the turbine as well as the entire power plant. One of the ways for assessing materials degradation is through microscopic imaging of sections of parts that have been removed. However, assessing the state of the material for multiple parts or multiple sections of a part is a human labor and domain knowledge oriented task that limits extensive inspection of the parts due to cost and time constraints.

Currently, images of material microstructure are studied by material experts and the state of the component, for example, the level of degradation is recorded. The process is largely manual and somewhat subjective, based on the quality of the images.

SUMMARY

Briefly, aspects of the present disclosure are directed to techniques for automated microstructure analysis of material microstructure.

According an aspect of the present disclosure a computer-implemented method is provided for assessing material microstructure of a machine component. The method comprises obtaining a raw image of a section of the component captured via a microscope. The method further comprises pre-processing the raw image to generate a ternary image defined by pixel data including three levels of intensities. The method further comprises identifying, from the ternary image, phase boundaries delineating a phase in a primary constituent material of the component. The method further comprises determining a volume associated with the phase based on the identified phase boundaries.

Other aspects of the present disclosure implement features of the above-described method in computing systems and computer program products.

Aspects of the present disclosure may be utilized, for example, as an automated tool for assessing material degradation and for quality control of gas turbine engine components.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Aspects of the present disclosure provide an automated technique for analyzing material microstructure to assess the state of a material in a machine component. During service of a component, the state of the primary constituent material, typically an alloy, may be affected, for example, by depletion of certain beneficial phases or by creation of detrimental phases. Alloy phases may change over time due to exposure to temperature and/or chemicals by various mechanisms, for example, due to change in crystal structure, deposition of elements at grain boundaries that were previously in solution, among others. Phase deposition or phase depletion may be therefore used to assess material degradation.

The present inventors have developed an automated pipeline capable of effectively processing a microstructure image of a section of a component for quantifying certain properties of interest, such as percentage of phase deposition or depletion. While the disclosed embodiments pertain to a determination of phase depletion, the underlying workflow may also be applied to determine defects per unit area. Furthermore, aspects of the present disclosure may be utilized not only for assessing material degradation of parts in service, but may also be applied to quality control of new batches of parts.

Figure 1:
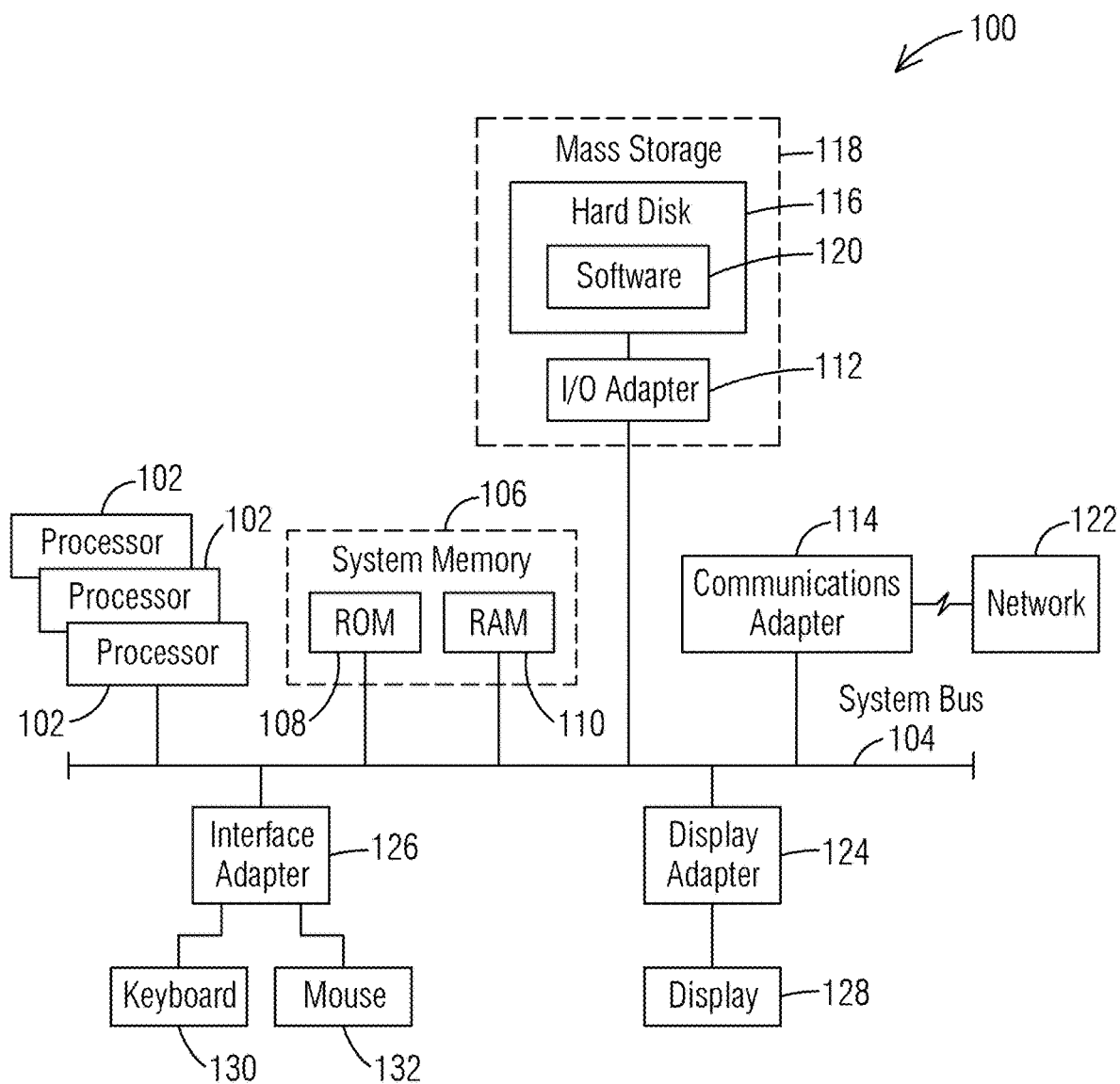
FIG. 1 is a block diagram of an example of a computing system wherein aspects of the present disclosure may be implemented

Turning now to FIG. 1, a computing system 100 is generally shown wherein aspects of the present disclosure may be implemented. The computing system 100 can be an electronic, computer framework comprising and/or employing any number and combination of computing devices and networks utilizing various communication technologies. The computing system 100 may be easily scalable, extensible, and modular, with the ability to change to different services or reconfigure some features independently of others. The computing system 100 may be, for example, a server, desktop computer, laptop computer, tablet computer, or smartphone. In some examples, computing system 100 may be a cloud computing node.

Computing system 100 may be described in the general context of computer executable instructions, such as program modules, being executed by a computing system. Generally, program modules may include routines, programs, objects, components, logic, data structures, and so on that perform particular tasks or implement particular abstract data types. Computing system 100 may be practiced in distributed cloud computing environments where tasks are performed by remote processing devices that are linked through a communications network. In a distributed cloud computing environment, program modules may be located in both local and remote computing system storage media including memory storage devices.

As shown in FIG. 1, the computing system 100 has one or more processors 102, which may include, for example, one or more central processing units (CPU), graphics processing units (GPU), or any other processor known in the art. The processors 102 can be a single-core processor, multi-core processor, computing cluster, or any number of other configurations. The processors 102, also referred to as processing circuits, are coupled via a system bus 104 to a system memory 106 and various other components. The system memory 106 can include a read only memory or ROM 108 and a random access memory or RANI 110. The ROM 108 is coupled to the system bus 104 and may include a basic input/output system (BIOS), which controls certain basic functions of the computing system 100. The RAM 110 is read-write memory coupled to the system bus 104 for use by the processors 102. The system memory 106 provides temporary memory space for operations of said instructions during operation. The system memory 106 can include random access memory (RAM), read only memory, flash memory, or any other suitable memory systems.

The computing system 100 comprises an I/O adapter 112 (input/output adapter) and a communications adapter 114 coupled to the system bus 104. The I/O adapter 112 may be a small computer system interface (SCSI) adapter that communicates with a hard disk 116 and/or any other similar component. The I/O adapter 112 and the hard disk 116 are collectively referred to herein as a mass storage 118.

Software 120 for execution on the computing system 100 may be stored in the mass storage 118. The mass storage 118 is an example of a tangible storage medium readable by the processors 102, where the software 120 is stored as instructions for execution by the processors 102 to cause the computing system 100 to operate, such as is described herein below with respect to the various Figures. Examples of computer program product and the execution of such instruction is discussed herein in more detail. The communications adapter 114 interconnects the system bus 104 with a network 122, which may be an outside network, enabling the computing system 100 to communicate with other such systems. In one embodiment, a portion of the system memory 106 and the mass storage 118 collectively store an operating system, which may be any appropriate operating system, to coordinate the functions of the various components shown in FIG. 1.

Additional input/output devices are shown as connected to the system bus 104 via a display adapter 124 and an interface adapter 126. In one embodiment, the I/O adapter 112, the communications adapter 114, the display adapter 124 and the interface adapter 126 may be connected to one or more I/O buses that are connected to the system bus 104 via an intermediate bus bridge (not shown). A display 128 (e.g., a screen or a display monitor) is connected to the system bus 104 by the display adapter 124, which may include a graphics controller to improve the performance of graphics intensive applications and a video controller. A keyboard 130, a mouse 132, among other input/output devices, can be interconnected to the system bus 104 via the interface adapter 126, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computing system 100 includes processing capability in the form of the processors 102, and, storage capability including the system memory 106 and the mass storage 118, input means such as the keyboard 130 and the mouse 132, and output capability including the display 128.

In some embodiments, the communications adapter 114 can transmit data using any suitable interface or protocol, such as the internet small computing system interface, among others. The network 122 may be a cellular network, a radio network, a wide area network (WAN), a local area network (LAN), or the Internet, among others. An external computing device may connect to the computing system 100 through the network 122. In some examples, an external computing device may be an external webserver or a cloud computing node.

It is to be understood that the block diagram of FIG. 1 is not intended to indicate that the computing system 100 is to include all of the components shown in FIG. 1. Rather, the computing system 100 can include any appropriate fewer or additional components not illustrated in FIG. 1 (e.g., additional memory components, embedded controllers, modules, additional network interfaces, etc.). Further, the embodiments described herein with respect to computing system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
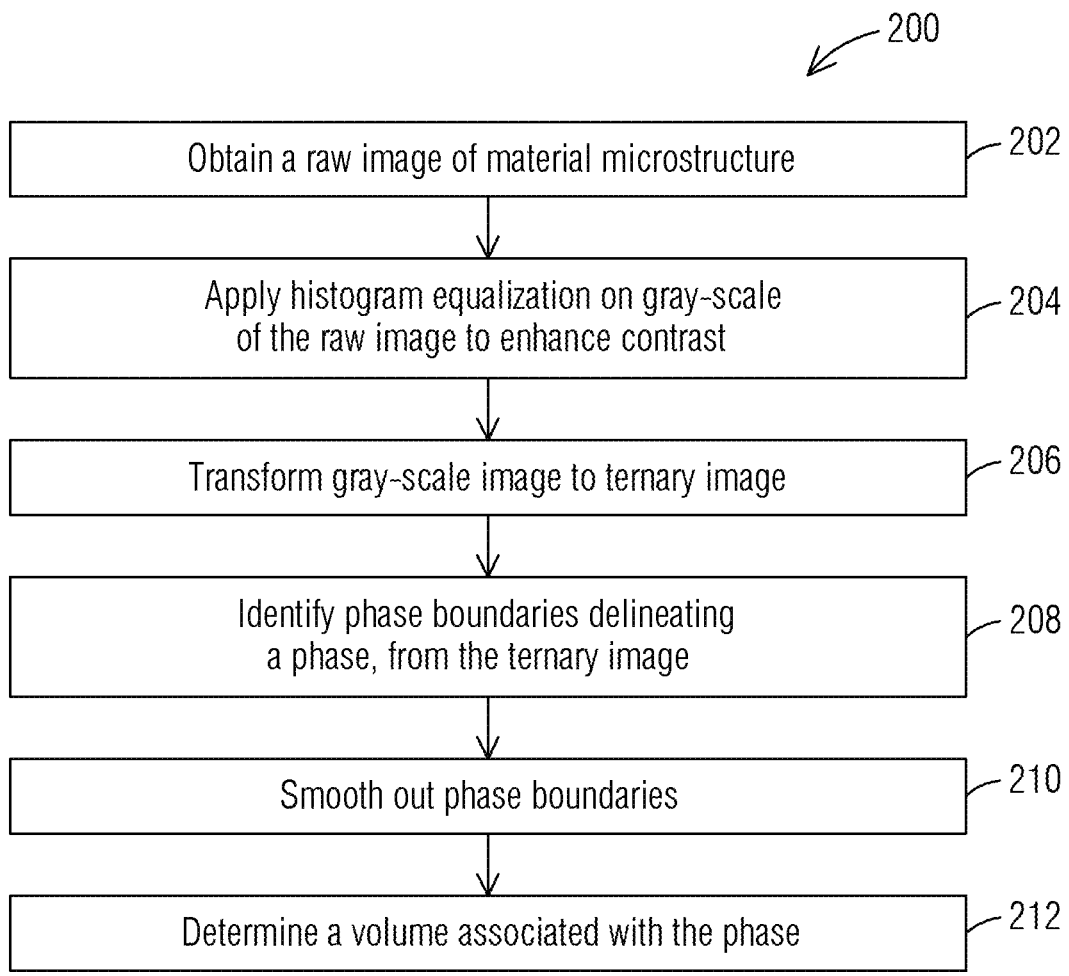
FIG. 2 is a flowchart illustrating an automated method for microstructure analysis according to one embodiment of the disclosure.

FIG. 2 illustrates an automated method 200 for analyzing material microstructure according to an aspect of the present disclosure. The method 200 may be implemented, for example, in conjunction with the computing system 100 illustrated in FIG. 1.

Figure 3:
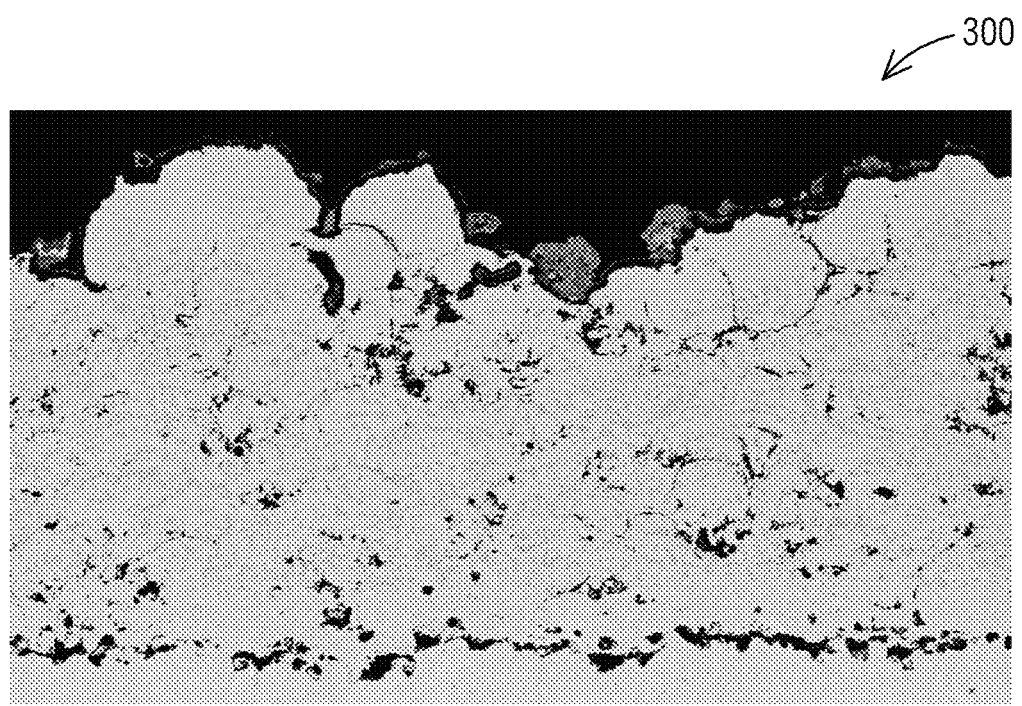
FIG. 3 shows an example of a raw image obtained from a scanning electron microscope showing material microstructure of a machine component.

Block 202 of the method 200 involves obtaining a raw image of a section of a machine component, such as a gas turbine engine component. In the context of this description, the term "image" refers to a digital image composed of a two-dimensional array of picture elements or pixels, each with finite, discrete quantities of numeric representation for its intensity. A polychrome or color image may additionally include color information in each pixel. An image of a section of the machine component may be captured by a microscope, including, for example, an electron microscope or an optical microscope. In an exemplary embodiment, a scanning electron microscope (SEM) may be used to capture a raw image revealing material microstructure at a section of the machine component. In some embodiments, for example, when using an electron microscope, the raw image may comprise a monochrome or gray-scale image. FIG. 3 depicts a monochrome raw image 300 of a section of a machine component obtained via SEM. In other embodiments, for example when using an optical microscope, the raw image may comprise a color image.

To efficiently analyze the material micro-structure, the raw image obtained at block 202 is pre-processed, using computer image processing techniques, to generate a ternary image defined by pixel data including three levels of intensities. In the illustrated method 200, the image pre-processing broadly includes blocks 204 and 206.

Figure 4:
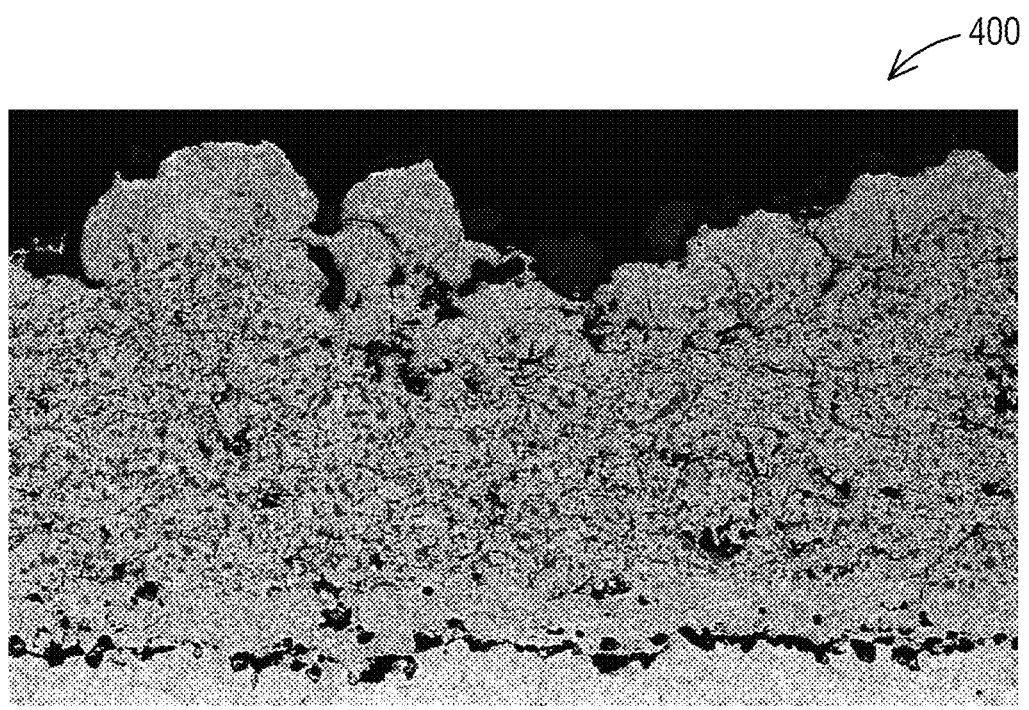
FIG. 4 illustrates an intermediate gray-scale image generated by histogram equalization of the raw image.

Block 204 includes enhancing the contrast of the raw image by a method of histogram equalization applied to a gray-scale of the raw image. A gray-scale image is one where each pixel carries only intensity information. Most image file formats support a minimum of 8-bit gray-scale, which provides 256 levels of intensities per pixel. In some embodiments, the raw image obtained from the microscope may comprise a gray-scale image. In alternate embodiments, when the raw image comprises a color image, it is first converted into a gray-scale image by removing color information from the pixels. The method of histogram equalization involves generating an image intensity histogram of the gray-scale of the raw image and spreading out the most frequent intensity values, i.e. stretching out the intensity range of the image. This method increases the global contrast of the image when its usable data is represented by close contrast values. This allows for areas of lower local contrast to gain a higher contrast. FIG. 4 shows an intermediate gray-scale image 400 having enhanced contrast, generated by the processing at block 204.

Figure 5:
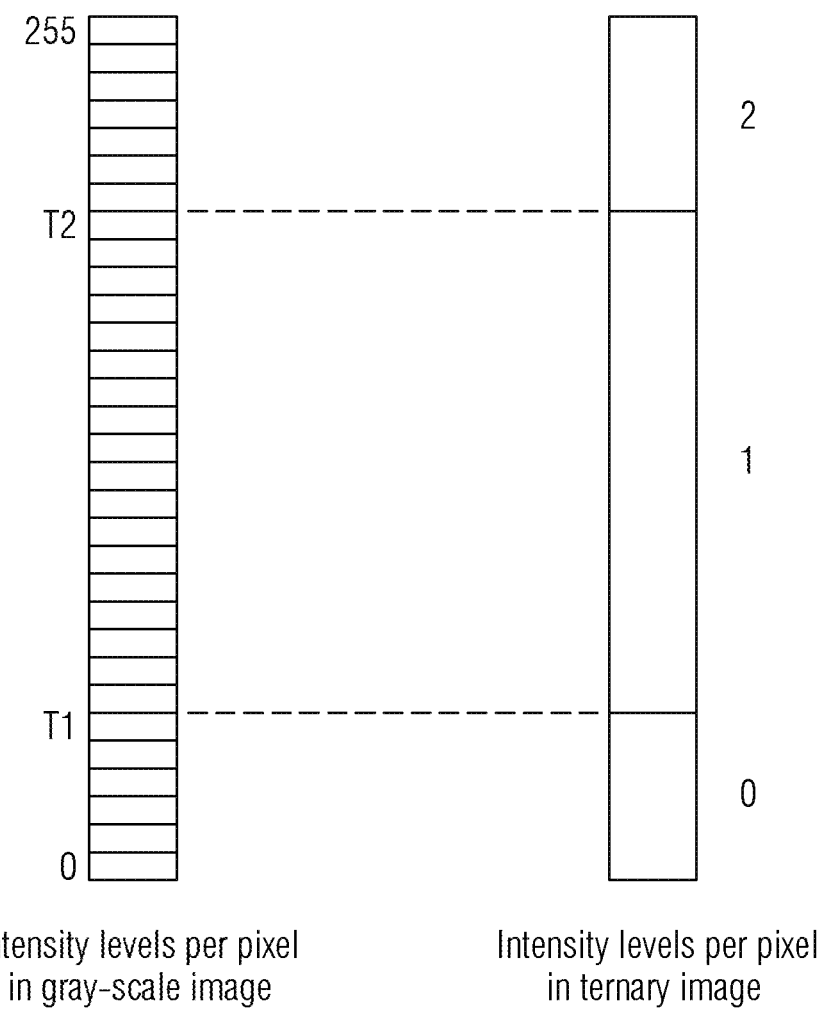
FIG. 5 schematically illustrates a transformation of intensity levels from the intermediate gray-scale image to a ternary image.
Figure 6:
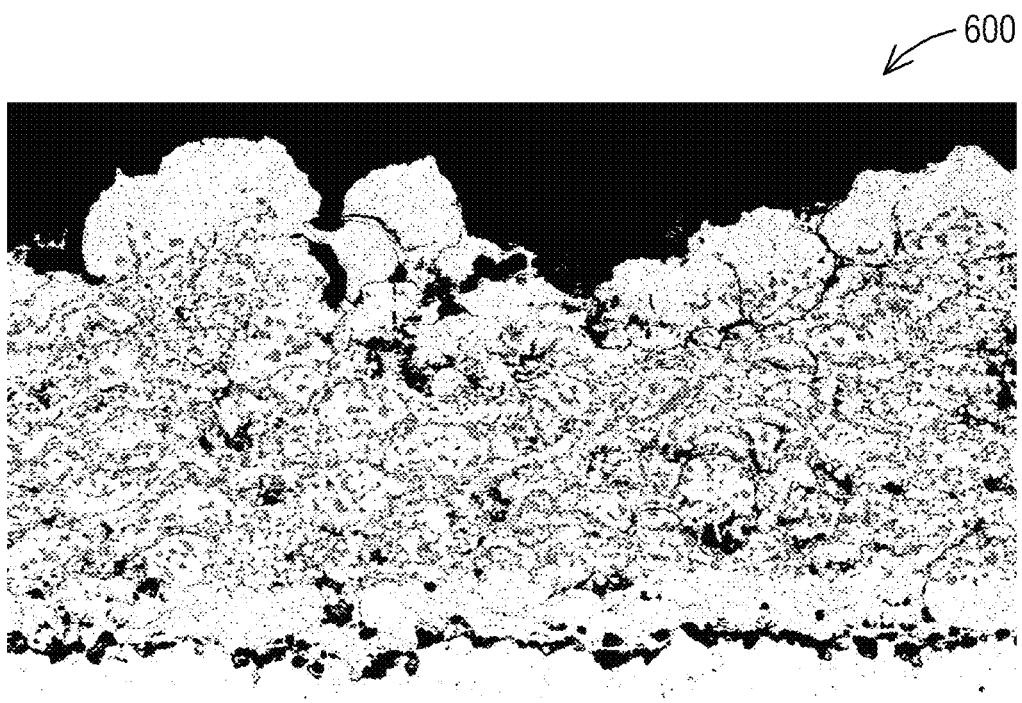
FIG. 6 shows a ternary image generated from the intermediate gray-scale image.

Continuing with reference to FIG. 2, a subsequent block 206 involves transforming the intermediate gray-scale image 400 (shown in FIG. 4) into a ternary image 600 (shown in FIG. 6). A ternary image is an image having three levels of intensities per pixel. As shown in FIG. 5, the transformation of the intermediate gray-scale image having 256 (or more) levels of intensities per pixel to a ternary image having three levels of intensities per pixel is executed based on the determination of a first (or lower) threshold intensity value T1 and a second (or upper) threshold intensity value T2. The three levels of intensities in the ternary image may include a lowest level (intensity value 0), an intermediate level (intensity value 1) and a highest level (intensity value 2). The lowest level of intensity (intensity value 0) in the ternary image may be mapped to intensity levels in the intermediate gray-scale image that are equal to or lesser than the first threshold intensity value T1. The intermediate level of intensity (intensity value 1) in the ternary image may be mapped to intensity levels in the intermediate gray-scale image that are between the first and second threshold intensity values T1, T2. The highest level of intensity (intensity value 2) in the ternary image may be mapped to intensity levels in the intermediate gray-scale image that are equal to or greater than the second threshold intensity value T2. FIG. 6 shows a ternary image 600 generated by the processing at block 206.

To generate the ternary image 600, the first and second threshold intensity values T1, T2 may be determined such that the lowest level of intensity includes an intensity corresponding to a background of the image, the intermediate level of intensity includes an intensity corresponding to a phase of interest (such as a β-phase), and the highest level of intensity includes an intensity corresponding to the primary constituent material of the component in which the phase is formed. The first and second threshold intensity values T1, T2 may be determined in an application specific manner as a function of the image intensity histogram of the intermediate gray-scale image 400 (for example, based on the overall illumination, position of peaks, etc.). A ternary image having the above described intensity levels is shown to greatly simplify the identification of phase boundaries in the subsequent steps.

Referring back to FIG. 2, block 208 of the method involves identifying, from the ternary image 600, phase boundaries delineating a phase of interest in the primary constituent material of the component.

Figure 7:
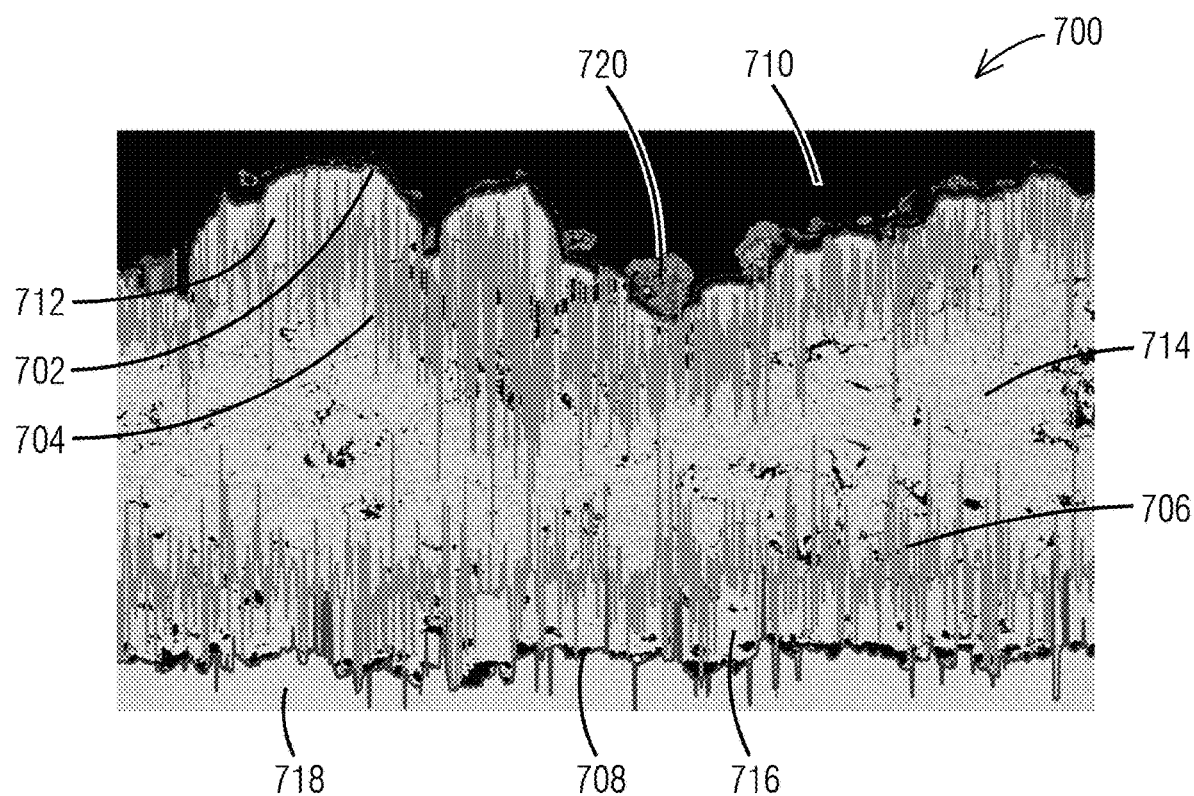
FIG. 7 shows an image with identified phase boundaries delineating a phase of a primary constituent material of the component.

FIG. 7 shows an image 700 with identified phase boundaries 702, 704, 706 and 708. In the shown example, the phase of interest is a β-phase 714 in the primary constituent alloy of the component. During service, exposure to high temperatures results in oxidation of the alloy metals (e.g., Al, Cr, etc.) at the outer surface of the component, leading to formation of oxide particles 720. This oxidation depletes the β-phase 714, whereby an outer depletion region 712 is formed. The outer depletion region 712 is located between the β-phase 714 and the background 710 in the image 700. Additionally, there may also be a migration of material from the β-phase 714 inward into an unaffected material (or substrate) 718, which may have a different composition than the primary constituent alloy This inward migration of material results in the formation of an inner depletion region 716. The inner depletion region 716 is located between the β-phase 714 and the unaffected material 718 in the image 700.

Referring jointly to FIG. 2 and FIG. 7, in the present example, the block 208 of the method 200 includes: identifying a first phase boundary 702 separating the outer depletion region 712 and the background 710, a second phase boundary 704 separating the β-phase 714 and the outer depletion region 712, a third phase boundary 706 separating the β-phase 714 and the inner depletion region 716, and a fourth phase boundary 708 separating the inner depletion region 716 an the unaffected material 718. The phase boundaries 702, 704, 706 and 708 may be identified based on thresholding parameters that define points of inflection in the ternary image. The thresholding parameters are typically vision-based in nature and provide clear delineation between individual phases or region in the ternary image. The thresholding parameters may be obtained from optical, color or intensity maps for a two-phase, three-phase or multi-phase microstructure. In the present embodiment, the thresholding parameters may include, for example, a threshold change (for e.g., expressed as a percentage change) in material density with respect to a mean material density of a region/phase in the ternary image. In this case, a point of inflection from one phase/region to the next may be identified when the threshold change in material density is reached. The identified phase boundaries 702, 704, 706 and 708 may be displayed superimposed on the image 700, as shown in FIG. 7. The thresholding parameters may be determined based on a heuristic or rule-based function. In one embodiment, the thresholding parameters for identifying phase boundaries may be determined by a machine learning algorithm, trained on prior data.

Figure 8:
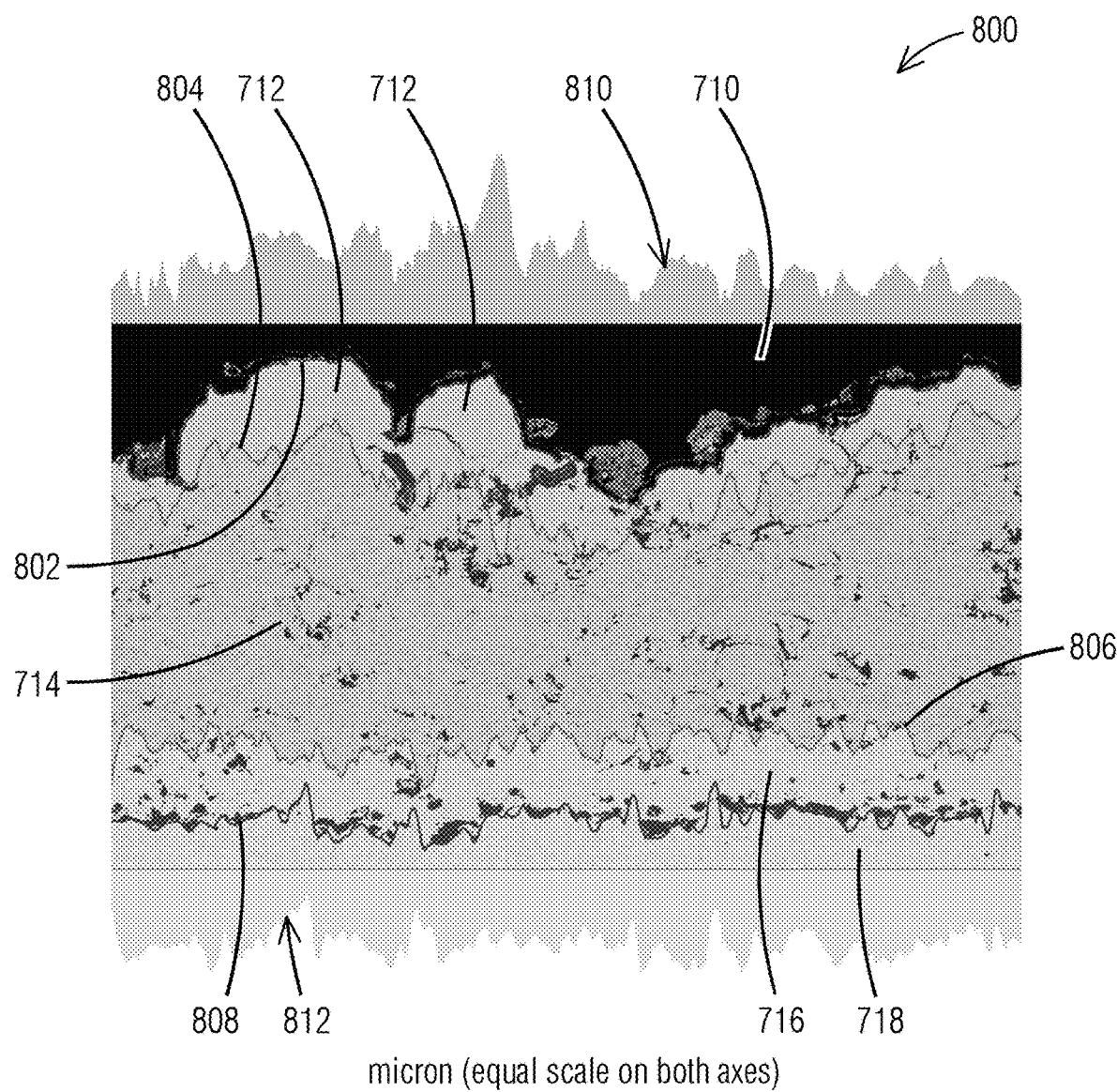
FIG. 8 shows an image with smoothened phase boundaries.

The method 200 of FIG. 2 may include an additional block 210 that involves applying a smoothing filter on the identified phase boundaries 702, 704, 706 and 708 to eliminate noisy peaks and obtain smoothened phase boundaries 802, 804, 806 and 808 respectively, as shown in FIG. 8. The smoothened phase boundaries 802, 804, 806 and 808 may be utilized in subsequent determination of a volume associated with the β-phase. In some embodiments, the smoothing filter may involve applying a spline fit on the identified phase boundaries to obtain the smoothened phase boundaries. In some embodiments, the smoothened phase boundaries may be obtained by a Savitzky-Golay smoothing filter. The bandwidth of the smoothing filter may be determined based on a heuristic or rule-based function. In one embodiment, the bandwidth of the smoothing filter may be determined by a machine learning algorithm, trained on prior data. The smoothened phase boundaries 802, 804, 806 and 808 may be displayed superimposed on the image 800, as shown in FIG. 8.

Block 212 of the method 200 involves determining a volume associated with the β-phase, for example, a volume of phase depletion based on the identified phase boundaries, taking image magnification scales into consideration. In the present example, the volume of phase depletion is a sum of a volume of the outer depletion region 712 and a volume of the inner depletion region 716. As illustrated in FIG. 8, a cross-sectional thickness profile 810 of the outer depletion region 712 may be computed between the smoothened phase boundaries 802 and 804. Likewise, a cross-sectional thickness profile 812 of the inner depletion region 716 may be computed between the smoothened phase boundaries 806 and 808. The volumes of the outer depletion region 712 and the inner depletion region 716 may then be determined based on the computed respective thicknesses. The volume of phase depletion may be utilized to asses a material degradation of a machine component in service. The remaining volume of the β-phase 714 (i.e., the un-depleted portion of the β-phase) may be determined based on a cross-sectional thickness between the smoothened phase boundaries 804 and 806, or may be determined by subtracting the total phase depletion volume from a total volume associated with the β-phase between the smoothened phase boundaries 802 and 808. The remaining volume of the β-phase 714 may be used to predict a remaining service life of the machine component.

An automated tool capable of detection, classification and recording of microstructure image analysis would enable a convenient for use of the proposed technique by less trained personnel and make it widely available as an inspection tool. In one embodiment, the above-described method may be applied to a sequence of microscope images of the machine component at different points during service, and the respective results may be recorded in a searchable database. In a further embodiment, the above-described method may be applied to a plurality of machine components of the same kind and respective results may be recorded to create a statistical database of a level of phase depletion at different regions of the machine components. These statistics may be deciphered in the context of the exposure of the material to the spatial distribution of environmental or boundary conditions. In a further implementation, the above-described method be utilized to train a machine learning algorithm to predict a material behavior of an engine component based on a specified operating profile of the engine.

Aspects of the present disclosure may include a system, a method, and/or a computer program product at any possible technical detail level of integration. The computer program product may include a computer readable storage medium (or media) having computer readable program instructions thereon for causing a processor to carry out aspects of the present disclosure. A computer readable storage medium, as used herein, is understood to be a non-transitory storage medium, which is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems and processes may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for assessing material microstructure of a machine component, comprising:
    obtaining a raw image of a section of the component captured via a microscope,
    pre-processing the raw image to generate a ternary image defined by pixel data including three levels of intensities,
    identifying, from the ternary image, phase boundaries delineating a phase in a primary constituent material of the component, and
    determining, based on the identified phase boundaries, a volume of at least one depletion region associated with the phase and/or a volume of an un-depleted portion of the phase.

2. The method of claim 1, wherein pre-processing the raw image comprises:
    applying histogram equalization on a gray-scale histogram of the raw image to obtain an intermediate gray-scale image with enhanced contrast, and
    transforming the intermediate gray-scale image into the ternary image based on defined first and second threshold intensity values.

3. The method of claim 1, wherein the three levels of intensities in the ternary image comprise: a lowest level of intensity including an intensity corresponding to a background, an intermediate level of intensity including an intensity corresponding to the phase, and a highest level of intensity including an intensity corresponding to the primary constituent material of the component.

4. The method of claim 1, wherein the phase boundaries are identified based on a determination of thresholding parameters indicative of points of inflection in the ternary image.

5. The method of claim 4, wherein the thresholding parameters are determined based on a machine learning algorithm trained on prior data.

6. The method of claim 1, comprising applying a smoothing filter to generate smoothened phase boundaries from the identified phase boundaries, wherein the smoothened phase boundaries are utilized in the determination of the volume associated with the phase.

7. The method of claim 6, wherein a bandwidth of the smoothing filter is determined based on a machine learning algorithm trained on prior data.

8. The method of claim 1, wherein the at least one depletion region comprises an inner depletion region located between the phase and an unaffected material and an outer depletion region located between the phase and a background,
    wherein identifying the phase boundaries comprises:
        identifying a first phase boundary separating the outer depletion region from the background,
        identifying a second phase boundary separating the phase from the outer depletion region,
        identifying a third phase boundary separating the phase from the inner depletion region, and
        identifying a fourth phase boundary separating the inner depletion region from the unaffected material.

9. The method of claim 1, comprising applying the method to a sequence of microscope images of the machine component at different points during service and recording respective results in a searchable database.

10. The method of claim 1, comprising applying the method to a plurality of machine components of the same kind and recording respective results to create a statistical database of a level of phase depletion at different regions of the machine components.

11. A non-transitory computer-readable storage medium, the computer-readable storage medium including instructions that when executed by a computer, cause the computer to:
    obtain a raw image of a section of the component captured via a microscope,
    pre-process the raw image to generate a ternary image defined by pixel data including three levels of intensities,
    identify, from the ternary image, phase boundaries delineating a phase in a primary constituent material of the component, and
    determine, based on the identified phase boundaries, a volume of at least one depletion region associated with the phase and/or a volume of an un-depleted portion of the phase.

12. A computing system comprising:
    a processor; and
    a memory storing instructions that, when executed by the processor, configure the computing system to:
        obtain a raw image of a section of the component captured via a microscope,
        pre-process the raw image to generate a ternary image defined by pixel data including three levels of intensities,
        identify, from the ternary image, phase boundaries delineating a phase a primary constituent material of the component, and
        determine based on the identified phase boundaries, a volume of at least one depletion region associated with the phase and/or a volume of an un-depleted portion of the phase.

13. The computing system of claim 12, wherein for pre-processing the raw image, the computing system is configured to:
    apply histogram equalization on a gray-scale histogram of the raw image to obtain an intermediate gray-scale image with enhanced contrast, and
    transform the intermediate gray-scale image into the ternary image based on defined first and second threshold intensity values.

14. The computing system of claim 12, wherein the three levels of intensities in the ternary image comprise: a lowest level of intensity including an intensity corresponding to a background, an intermediate level of intensity including an intensity corresponding to the phase, and a highest level of intensity including an intensity corresponding to the primary constituent material of the component.

15. The computing system of claim 12, wherein the computing system is configured to identify the phase boundaries based on the determination of thresholding parameters indicative of points of inflection in the ternary image.

16. The computing system of claim 15, wherein computing system is configured to determine the thresholding parameters based on a machine learning algorithm trained on prior data.

17. The computing system of claim 12, wherein the computing system is configured to apply a smoothing filter to generate smoothened phase boundaries from the identified phase boundaries, wherein the smoothened phase boundaries are utilized in the determination of the volume associated with the phase.

18. The computing system of claim 17, wherein the computing system is configured to determine a bandwidth of the smoothing filter based on a machine learning algorithm trained on prior data.

\* \* \* \* \*